(12) United States Patent
Sun et al.

(10) Patent No.: US 9,479,316 B2
(45) Date of Patent: Oct. 25, 2016

(54) UNICAST COMMUNICATION METHOD, APPARATUS, AND SYSTEM

(71) Applicant: HUAWEI TECHNOLOGIES CO., LTD., Shenzhen (CN)

(72) Inventors: Lixin Sun, Beijing (CN); Sha Ma, Beijing (CN); Yang Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 14/298,572

(22) Filed: Jun. 6, 2014

(65) Prior Publication Data

US 2014/0307665 A1    Oct. 16, 2014

Related U.S. Application Data

(63) Continuation of application No. PCT/CN2012/086177, filed on Dec. 7, 2012.

(30) Foreign Application Priority Data

Dec. 7, 2011    (CN) .......................... 2011 1 0403318

(51) Int. Cl.
*H04L 5/00* (2006.01)
*H04L 1/00* (2006.01)
*H04L 1/18* (2006.01)

(52) U.S. Cl.
CPC .......... *H04L 5/0058* (2013.01); *H04L 1/0003* (2013.01); *H04L 1/0009* (2013.01); *H04L 1/0015* (2013.01); *H04L 1/0041* (2013.01);
(Continued)

(58) Field of Classification Search
None
See application file for complete search history.

(56) References Cited

U.S. PATENT DOCUMENTS

2003/0128658 A1*   7/2003   Walton ..................... H04L 1/06
                                                    370/208
2006/0036930 A1*   2/2006   Luby ..................... H03M 13/03
                                                    714/786
(Continued)

FOREIGN PATENT DOCUMENTS

CN          1414715 A      4/2003
CN        101388867 A      3/2009
(Continued)

OTHER PUBLICATIONS

European Extended Search Report issued on Sep. 11, 2014 in corresponding European Patent Application No. 12855626.3.
(Continued)

*Primary Examiner* — Jenee Williams
(74) *Attorney, Agent, or Firm* — Staas & Halsey LLP

(57) ABSTRACT

The unicast communication method includes: grouping, by a base station, terminals based on channel condition levels according to measurement information of an uplink channel, so as to obtain at least two channel condition level groups; selecting a modulation-coding mode suitable for each channel condition level group, and decoding a packet to be sent to a terminal by using fountain codes, so as to obtain a fountain code block; sending the fountain code block to the terminal; receiving, by the terminal, the fountain code block of the packet sent by the base station; determining a channel condition level group to which the terminal belongs, decoding the fountain code block by using the modulation-coding mode corresponding to the channel condition level group; and sending or not sending acknowledgment feedback to the base station.

17 Claims, 7 Drawing Sheets

(52) U.S. Cl.
CPC ..... *H04L 1/1812* (2013.01); *H04L 2001/0092* (2013.01)

(56) References Cited

U.S. PATENT DOCUMENTS

| | | | |
|---|---|---|---|
| 2007/0136525 A1* | 6/2007 | Read | G06F 11/1076 711/114 |
| 2008/0232301 A1 | 9/2008 | Cai et al. | |
| 2009/0110087 A1* | 4/2009 | Liu | H04L 1/0021 375/260 |
| 2009/0150743 A1 | 6/2009 | Agarwal | |
| 2009/0219856 A1* | 9/2009 | Richardson | H04W 72/044 370/328 |
| 2009/0232073 A1* | 9/2009 | Yan | H04W 72/085 370/329 |
| 2010/0054212 A1* | 3/2010 | Tang | H04L 25/03343 370/335 |
| 2010/0067439 A1 | 3/2010 | Simmons et al. | |
| 2010/0172316 A1* | 7/2010 | Hwang | H04L 5/0007 370/330 |
| 2010/0182950 A1* | 7/2010 | Sexton | H03M 7/30 370/328 |
| 2011/0142073 A1* | 6/2011 | Jung | H04L 1/007 370/474 |
| 2011/0158096 A1* | 6/2011 | Leung | H04L 47/35 370/232 |

FOREIGN PATENT DOCUMENTS

| | | |
|---|---|---|
| CN | 101534507 A | 9/2009 |
| CN | 101667904 A | 3/2010 |
| EP | 1 971 170 A1 | 9/2008 |
| EP | 1 973 255 A1 | 9/2008 |
| KR | 10-2010-0028027 | 3/2010 |
| WO | 2008/136792 A1 | 11/2008 |

OTHER PUBLICATIONS

Castura J., et al., "Rateless Coding over Fading Channels", IEEE Communications Letters, vol. 10, No. 1, Jan. 2006, pp. 46-48.
Office Action mailed Feb. 28, 2015 for corresponding Chinese Patent Application No. 201110403318.0.
International Search Report mailed Mar. 14, 2013 in corresponding International Patent Application No. PCT/CN2012/086177.
International Search Report mailed Mar. 14, 2013, in corresponding International Patent Application No. PCT/CN2012/086177.
Korean Office Action dated Nov. 9, 2015 in corresponding Korean Patent Application No. 10-2014-7017238, 11 pages.
Japanese Notice of Allowance dated Mar. 1, 2016 in corresponding Japanese Patent Application No. 2014-545086, 3 pages.

* cited by examiner

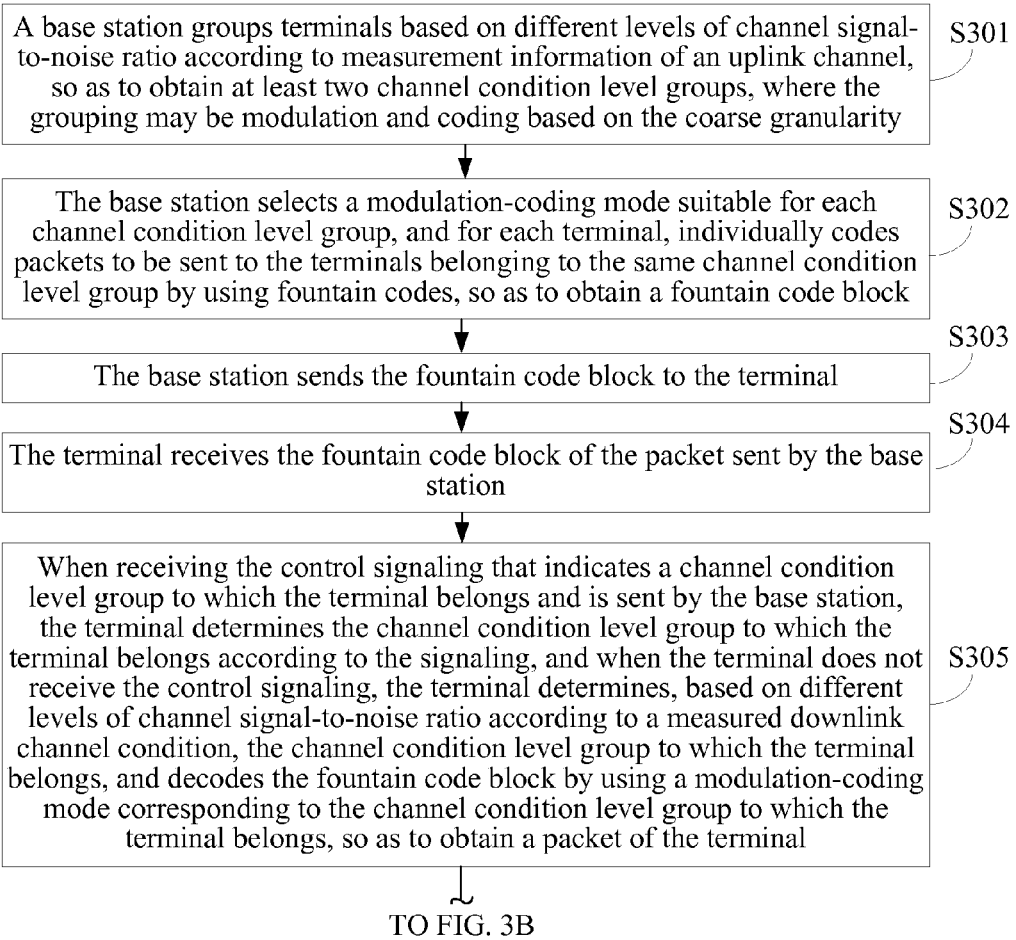

| | |
|---|---|
| A base station groups terminals based on different levels of channel signal-to-noise ratio according to measurement information of an uplink channel, so as to obtain at least two channel condition level groups, where the grouping may be modulation and coding based on the coarse granularity | S301 |
| The base station selects a modulation-coding mode suitable for each channel condition level group, and for each terminal, individually codes packets to be sent to the terminals belonging to the same channel condition level group by using fountain codes, so as to obtain a fountain code block | S302 |
| The base station sends the fountain code block to the terminal | S303 |
| The terminal receives the fountain code block of the packet sent by the base station | S304 |
| When receiving the control signaling that indicates a channel condition level group to which the terminal belongs and is sent by the base station, the terminal determines the channel condition level group to which the terminal belongs according to the signaling, and when the terminal does not receive the control signaling, the terminal determines, based on different levels of channel signal-to-noise ratio according to a measured downlink channel condition, the channel condition level group to which the terminal belongs, and decodes the fountain code block by using a modulation-coding mode corresponding to the channel condition level group to which the terminal belongs, so as to obtain a packet of the terminal | S305 |

CONT. FROM FIG. 3A

If decoding is not completed within a set period of time, the terminal sends acknowledgement feedback of an unsuccessful response NACK to the base station, and adjusts the terminal to a group of a lower channel condition level, where the group of the lower channel condition level has a signal-to-noise ratio lower than that of a group to which the terminal currently belongs, so that when receiving a next fountain code block, the terminal decodes the next fountain code block by using a modulation-coding mode corresponding to the group of the lower channel condition level; and if decoding is completed within a set period of time, the terminal sends acknowledgement feedback of a successful response ACK to the base station, and adjust the terminal to a group of a higher channel condition level, where the group of the higher channel condition level has a signal-to-noise ratio higher than that of a group to which the terminal currently belongs, so that when receiving a next fountain code block, the terminal decodes the next fountain code block by using a modulation-coding mode corresponding to the group of the higher channel condition level — S306

If the base station receives, within a set period of time, the acknowledgement feedback of an unsuccessful response NACK sent by the terminal, the base station adjusts the terminal to the group of the lower channel condition level according to a set rule, where the group of the lower channel condition level has a signal-to-noise ratio lower than that of a group to which the terminal currently belongs; if the base station receives, within a set period of time, the acknowledgement feedback of a successful response ACK sent by the terminal, the base station adjusts the terminal to the group of the higher channel condition level according to a set rule, where the group of the higher channel condition level has a signal-to-noise ratio higher than that of a group to which the terminal currently belongs; or, if the base station does not receive, within a set period of time, acknowledgement feedback sent by the terminal, the base station does not adjust the channel condition level group to which the terminal belongs — S307

FIG. 3B

CONT. FROM FIG. 4A

If decoding is not completed within a set period of time, the terminal sends acknowledgement feedback of an unsuccessful response NACK to the base station, and adjusts the terminal to a group of a lower channel condition level, where the group of the lower channel condition level has a signal-to-noise ratio lower than that of a group to which the terminal currently belongs, so that when receiving a next fountain code block, the terminal decodes the next fountain code block by using a modulation-coding mode corresponding to the group of the lower channel condition level; if decoding is completed within a set period of time, the terminal sends acknowledgement feedback of a successful response ACK to the base station, and adjusts the terminal to a group of a higher channel condition level, where the group of the higher channel condition level has a signal-to-noise ratio higher than that of a group to which the terminal currently belongs, so that when receiving a next fountain code block, the terminal decodes the next fountain code block by using a modulation-coding mode corresponding to the group of the higher channel condition level — S406

If the base station receives, within a set period of time, the acknowledgement feedback of an unsuccessful response NACK sent by the terminal, the base station adjusts the terminal to the group of the lower channel condition level according to a set rule, where the group of the lower channel condition group has a signal-to-noise ratio lower than that of a group to which the terminal currently belongs; if the base station receives, within a set period of time, the acknowledgement feedback of a successful response ACK sent by the terminal, the base station adjusts the terminal to the group of the higher channel condition level according to a set rule, where the group of the higher channel condition level has a signal-to-noise ratio higher than that of a group to which the terminal currently belongs; or, if the base station does not receive, within a set period of time, acknowledgement feedback sent by the terminal, the base station does not adjust the channel condition level group to which the terminal belongs — S407

FIG. 4B

UNICAST COMMUNICATION METHOD, APPARATUS, AND SYSTEM

CROSS-REFERENCE TO RELATED APPLICATION

This application is a continuation of International Application No. PCT/CN2012/086177, filed on Dec. 7, 2012, which claims priority to Chinese Patent Application No. 201110403318.0, filed on Dec. 7, 2011, both of which are hereby incorporated by reference in their entireties.

TECHNICAL FIELD

The present invention relates to the communications field, and in particular, to a unicast communication method, an apparatus, and a system.

BACKGROUND

In the prior art, a unicast communication system uses a point-to-point propagation mode, and has the advantages that a server responds to a request of a client in time and can send different data in response to different requests of clients, and personalized service can be easily realized. With the rise of data services and improvement of the data rate, currently, most unicast communication systems mainly for transmission of a large amount of data traffic adopt an AMC (Adaptive modulation and coding, adaptive modulation and coding) and HARQ (Hybrid automatic repeat request, hybrid automatic repeat request) mechanism, so as to improve the transmission efficiency by adapting to channel characteristics.

However, in order to more accurately track the channel characteristics, a feedback overhead of the system is increased, which restricts the throughput of the system, and especially when the channel is unstable, a feedback grain may bring a heavy burden to the system. As a result, the system cannot efficiently support large-scale data transmission.

SUMMARY

Embodiments of the present invention provide a unicast communication method, an apparatus, and a system, so that channel quality feedback is not required, thereby reducing a feedback overhead in the system.

In order to achieve the objective, the embodiments of the present invention adopt the following technical solutions:

According to an aspect, a unicast communication method is provided, including:

grouping terminals based on channel condition levels according to measurement information of an uplink channel, so as to obtain at least two channel condition level groups;

selecting a modulation-coding mode suitable for each channel condition level group, and coding a packet to be sent to a terminal by using fountain codes, so as to obtain a fountain code block; and sending the fountain code block to the terminal.

According to an aspect, a unicast communication method is provided, including:

receiving a fountain code block of a packet sent by a base station;

determining a channel condition level group to which a terminal belongs, and decoding the fountain code block by using a modulation-coding mode corresponding to the channel condition level group; and sending or not sending acknowledgment feedback to the base station.

According to another aspect, a base station is provided, including:

a grouping unit, configured to group terminals based on channel condition levels according to measurement information of an uplink channel, so as to obtain at least two channel condition level groups;

a coding unit, configured to select a modulation-coding mode suitable for each channel condition level group, and code a packet to be sent to a terminal by using fountain codes, so as to obtain a fountain code block; and a sending unit, configured to send the fountain code block to the terminal.

According to another aspect, a terminal is provided, including:

a terminal receiving unit, configured to receive a fountain code block of a packet sent by a base station;

a decoding unit, configured to decode, according to a determined channel condition level group to which the terminal belongs, the fountain code block by using a modulation-coding mode corresponding to the channel condition level group; and a feedback unit, configured to send or not send acknowledgment feedback to the base station.

According to another aspect, a communication system is provided, including:

a base station, configured to group terminals based on channel condition levels according to measurement information of an uplink channel, so as to obtain at least two channel condition level groups; select a modulation-coding mode suitable for each channel condition level group, and code a packet to be sent to a terminal by using fountain codes, so as to obtain a fountain code block; and sending the fountain code block to the terminal; and at least one terminal, configured to receive the fountain code block of the packet sent by the base station; determine a channel condition level group to which the terminal belongs, decode the fountain code block by using a modulation-coding mode corresponding to the channel condition level group; and send or not send acknowledgment feedback to the base station.

According to the unicast communication method, the apparatus, and the system provided in the embodiments of the present invention, a base station groups terminals based on channel condition levels according to measurement information of an uplink channel, selects a modulation-coding mode suitable for each channel condition level group, and respectively codes a packet to be sent to a terminal by using fountain codes, so as to obtain a fountain code block, and then, sends the a code block coded by the fountain code; and the terminal receives the fountain code block and decodes the fountain code block by using a modulation-coding mode corresponding to a channel condition level group to which the terminal belongs, and merely sends acknowledgment feedback or does not send acknowledgment feedback to the base station. In this way, since the coding mode of the fountain codes does not require channel quality feedback, which is different from the AMC or HARQ in the prior art, a feedback overhead in the system is reduced, the throughput of the system is improved, and transmission of a large amount of data is supported.

BRIEF DESCRIPTION OF DRAWINGS

To illustrate the technical solutions according to the embodiments of the present invention or in the prior art more clearly, the following briefly introduces the accompanying drawings required for describing the embodiments or the prior art. Apparently, the accompanying drawings in the following descriptions merely show some of the embodiments of the present invention, and persons of ordinary skill in the art can obtain other drawings according to the accompanying drawings without creative efforts.

FIG. 3A and FIG. 3B are a flow chart of still another unicast communication method according to an embodiment of the present invention;

FIG. 4A and FIG. 4B are a flow chart of still another unicast communication method according to an embodiment of the present invention;

DESCRIPTION OF EMBODIMENTS

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
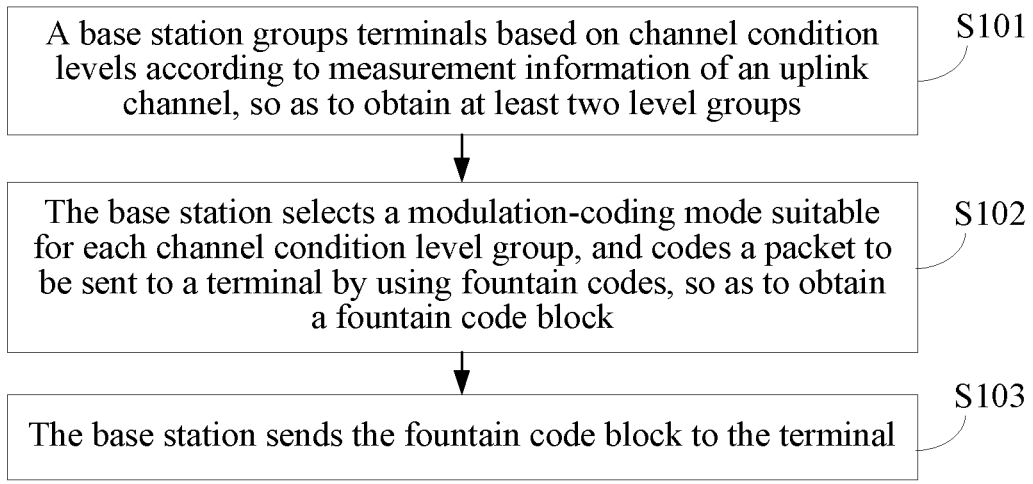
FIG. 1 is a flow chart of a unicast communication method according to an embodiment of the present invention.

As shown in FIG. 1, a unicast communication method provided in an embodiment of the present invention includes:

S101: A base station groups terminals based on channel condition levels according to measurement information of an uplink channel, so as to obtain at least two level groups.

Exemplarily, in this step, the grouping based on channel condition levels may be modulation and coding based on the coarse granularity.

In addition, the grouping may be performed according to the channel quality, PMI (precoding matrix index, precoding matrix index), or beam direction of the channel condition in the measurement information.

S102: The base station selects a modulation-coding mode suitable for each channel condition level group, and codes a packet to be sent to a terminal by using fountain codes, so as to obtain a fountain code block.

It should be noted herein that, the fountain codes have the following features that no feedback is required, or merely simple ACK feedback rather than channel condition feedback is required; the rate is not limited, and coding blocks may be continuously generated; the fountain code has randomness, and the coding blocks have peer contribution to decoding; and the fountain codes are suitable for multi-point parallel transmission or multi-point parallel receiving.

Therefore, the fountain codes do not require the channel condition feedback, that is, do not require channel quality feedback, so the space of occupied channel is saved, and a user may stop receiving data after obtaining desired data without influence of coding blocks lost in the transmission process.

Exemplarily, fountain code sending ends provided in the embodiment of the present invention may generate any number of coding groups from k original groups, and a receiving end may successfully restore all the original groups at a high probability through decoding, provided that the receiving end receives any $k(1+\epsilon)$ coding groups. The well-designed fountain codes not only have a low decoding overhead $\epsilon$, but also have a simple coding and decoding method and low coding and decoding complexity. Figuratively speaking, the coding process of the fountain codes is like the process that a fountain (coder) continuously generates water drops (coding groups), while we merely needs to receive sufficient amount of water drops with a cup (decoder), a purpose of drinking (successful decoding) can be achieved, regardless of whether the water drops (coding groups) flowing into the cup are specific water drops.

S103: The base station sends the fountain code block to the terminal.

According to the unicast communication method provided in this embodiment of the present invention, a base station groups terminals based on channel condition levels according to measurement information of an uplink channel, selects a modulation-coding mode suitable for each channel condition level group, and codes a packet to be sent to a terminal by using fountain codes, so as to obtain a fountain code block, and then, sends the fountain code block to the terminal. In this way, after receiving the fountain code block and decoding the fountain code block by using a modulation-coding mode corresponding to a channel condition level group to which the terminal belongs, the terminal may merely send acknowledgment feedback to the base station or not send acknowledgment feedback. Since the coding mode of the fountain codes does not require channel quality feedback, which is different from the AMC or HARQ in the prior art, a feedback overhead in the system is reduced, the throughput of the system is improved, and transmission of a large amount of data is supported.

Figure 2:
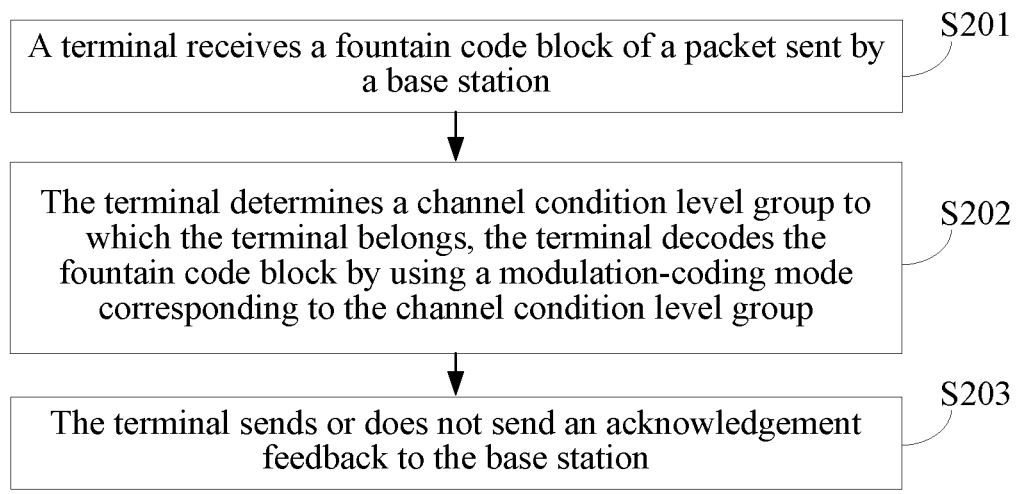
FIG. 2 is a flow chart of another unicast communication method according to an embodiment of the present invention.

As shown in FIG. 2, a unicast communication method provided in another embodiment of the present invention includes:

S201: A terminal receives a fountain code block of a packet sent by a base station.

S202: The terminal determines a channel condition level group to which the terminal belongs, and decodes the fountain code block by using a modulation-coding mode corresponding to the channel condition level group.

Exemplarily, the terminal may correspondingly decode the fountain code block according to a coding bit rate corresponding to the channel condition level group to which the terminal belongs.

S203: The terminal sends or does not send acknowledgment feedback to the base station.

Exemplarily, if decoding is not completed within a set period of time, the terminal may send acknowledgment feedback of an unsuccessful response NACK to the base station; or if decoding is completed within a set period of time, the terminal may send acknowledgment feedback of a successful response ACK to the base station; otherwise, the terminal does not send acknowledgment feedback.

According to the unicast communication method provided in this embodiment of the present invention, a terminal receives a fountain code block of a packet sent by a base station, decodes the fountain code block by using a modulation-coding mod corresponding to a channel condition level group to which the terminal belongs, and sends or does not send acknowledgment feedback to the base station. In this way, since the coding mode of the fountain codes does not require channel quality feedback, which is different from the AMC or HARQ in the prior art, a feedback overhead in the system is reduced, the throughput of the system is improved, and transmission of a large amount of data is supported.

As shown in FIG. 3A and FIG. 3B, a unicast communication method provided in still another embodiment of the present invention includes:

S301: A base station groups terminals based on different levels of channel signal-to-noise ratio according to measurement information of an uplink channel, so as to obtain at least two channel condition level groups, where the grouping may be modulation and coding based on the coarse granularity.

It deserves to be noted that, the grouping terminals based on channel condition levels may be performed according to the channel quality, PMI (precoding matrix index, precoding matrix index), or beam direction of the channel condition in the measurement information.

S302: The base station selects a modulation-coding mode suitable for each channel condition level group, and for each terminal, individually codes a packet to be sent to terminals belonging to the same channel condition level group by using fountain codes, so as to obtain a fountain code block.

S303: The base station sends the fountain code block to the terminal.

Exemplarily, before sending the fountain code block to the terminal, the base station may send control signaling indicating a channel condition level group to which the terminal belongs, or may also not send the control signaling.

In the process that the base station sends the fountain code block to the terminal, downlink channel fluctuation may exceed a set threshold. In this case, the fountain code block is discarded. By means of the features of the fountain codes, the terminal merely needs to receive sufficient number of correct code blocks, and the lost fountain code has no influence on decoding. In this way, the influence of fluctuation in the transmission process may be ignored, thereby improving the transmission efficiency.

S304: The terminal receives the fountain code block of the packet sent by the base station.

S305: When receiving the control signaling that indicates the channel condition level group to which the terminal belongs and is sent by the base station, the terminal determines, according to the signaling, the channel condition level group to which the terminal belongs, and when the terminal does not receive the control signaling, the terminal determines, based on different levels of channel signal-to-noise ratio according to a measured downlink channel condition, the channel condition level group to which the terminal belongs, and decodes the fountain code block by using a modulation-coding mode corresponding to the channel condition level group to which the terminal belongs, so as to obtain a packet of the terminal.

S306: If decoding is not completed within a set period of time, the terminal sends acknowledgment feedback of an unsuccessful response NACK to the base station, and adjusts the terminal to a group of a lower channel condition level, where the group of the lower channel condition level has a signal-to-noise ratio lower than that of a group to which the terminal currently belongs, so that when receiving a next fountain code block, the terminal decodes the next fountain code block by using a modulation-coding mode corresponding to the group of the lower channel condition level; and if decoding is completed within a set period of time, the terminal sends acknowledgment feedback of a successful response ACK to the base station, and adjusts the terminal to a group of a higher channel condition level, where the group of the higher channel condition level has a signal-to-noise ratio higher than that of a group to which the terminal currently belongs, so that when receiving a next fountain code block, the terminal decodes the next fountain code block by using a modulation-coding mode corresponding to the group of the higher channel condition level.

It deserves to be noted that, when the terminal is adjusted to the group of the lower channel condition level and a packet of a received next fountain code block is the same as that of a previous fountain code block for which decoding is not completed, the terminal may continuously decode, by using the modulation-coding mode corresponding to the group of the lower channel condition level, data demodulated from the previous fountain code block, so as to shorten the decoding time.

S307: If the base station receives, within a set period of time, the acknowledgment feedback of an unsuccessful response NACK sent by the terminal, the base station adjusts the terminal to the group of the lower channel condition level according to a set rule, where the group of the lower channel condition level has a signal-to-noise ratio lower than that of a group to which the terminal currently belongs; if the base station receives, within a set period of time, the acknowledgment feedback of a successful response ACK sent by the terminal, the base station adjusts the terminal to the group of the higher channel condition level according to a set rule, where the group of the higher channel condition level has a signal-to-noise ratio higher than that of a group to which the terminal currently belongs; or, if the base station does not receive, within a set period of time, acknowledgment feedback sent by the terminal, the base station does not adjust the channel condition level group to which the terminal belongs.

In this way, the base station selects a modulation-coding mode suitable for the channel condition of the group of the higher channel condition level, and for each terminal, individually codes a packet to be sent to terminals belonging to the group of the higher channel condition level by using fountain codes; on the other hand, the base station selects a modulation-coding mode suitable for a channel condition of the group of the lower channel condition level, and for each terminal, individually codes a packet to be sent to terminals belonging to the group of the lower channel condition level by using fountain codes.

Exemplarily, after the terminal is adjusted to the group of the higher channel condition level or the group of the lower channel condition level, the base station may set a protection time, and within the protection time, the base station does not adjust the channel condition level group to which the adjusted terminal belongs, so that the base station is prevented from excessively frequently adjusting the terminal, so as to avoid errors.

According to the unicast communication method provided in the embodiment of the present invention, a base station groups terminals based on channel condition levels according to measurement information of an uplink channel, selects a modulation-coding mode suitable for each channel condition level group, and codes a packet to be sent to a terminal by using fountain codes, so as to obtain a fountain code block, and then, sends the fountain code block to the terminal; and the terminal receives the fountain code block and decodes the fountain code block by using a modulation-coding mode corresponding to a channel condition level group to which the terminal belongs, and merely sends acknowledgment feedback or does not send acknowledgment feedback to the base station. In this way, since the coding mode of the fountain codes does not require channel quality feedback, which is different from the AMC or HARQ in the prior art, a feedback overhead in the system is reduced, the throughput of the system is improved, and transmission of a large amount of data is supported.

Figure 4A:
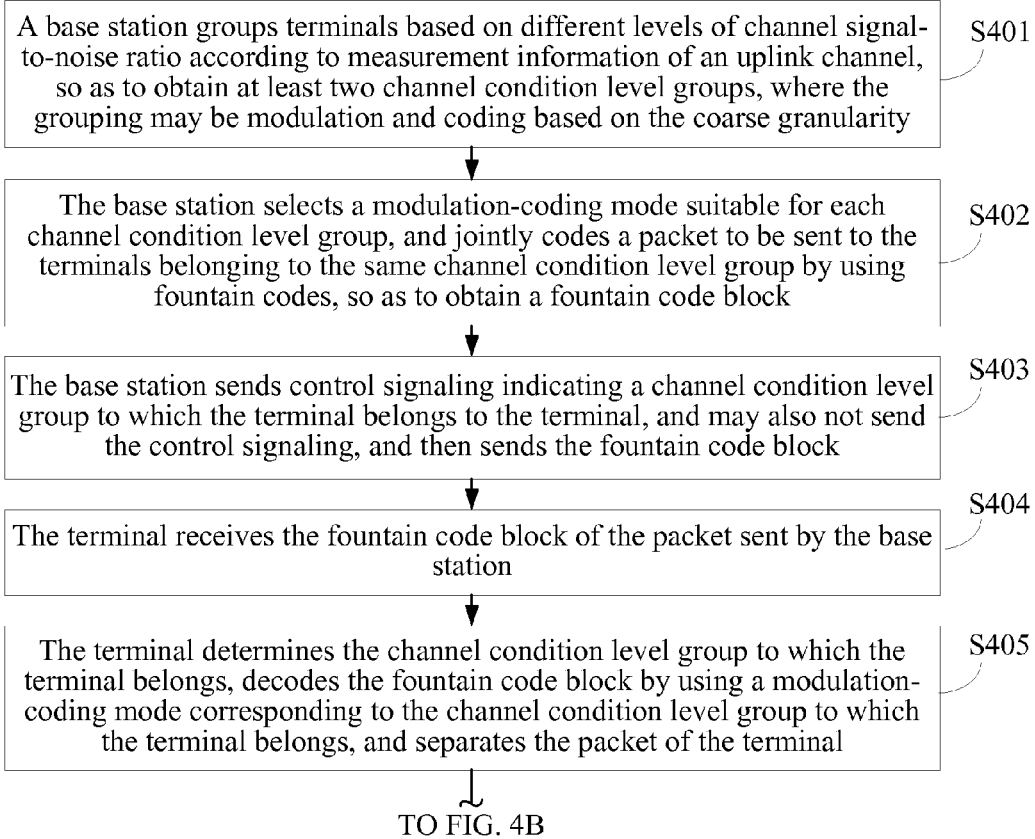

As shown in FIG. 4A and FIG. 4B, a unicast communication method provided in still another embodiment of the present invention includes:

S401: A base station groups terminals based on different levels of channel signal-to-noise ratio according to measurement information of an uplink channel, so as to obtain at least two channel condition level groups, where the grouping may be modulation and coding based on the coarse granularity.

S402: The base station selects a modulation-coding mode suitable for each channel condition level group, and jointly codes a packet to be sent to terminals belonging to the same channel condition level group by using fountain codes, so as to obtain a fountain code block.

S403: The base station sends control signaling indicating a channel condition level group to which the terminal belongs to the terminal, and may also not send the control signaling, and then sends the fountain code block.

Exemplarily, in the process that the base station sends the fountain code block to the terminal, downlink channel fluctuation may exceed a set threshold. In this case, the base station discards the fountain code block.

S404: The terminal receives the fountain code block of the packet sent by the base station.

S405: The terminal determines the channel condition level group to which the terminal belongs, decodes the fountain code block by using a modulation-coding mode corresponding to the channel condition level group to which the terminal belongs, and separates a packet of the terminal.

It should be noted that, when receiving the control signaling that indicates the channel condition level group to which the terminal belongs and is sent by the base station, the terminal determines, according to the signaling, the channel condition level group to which the terminal belongs, and when the terminal does not receive the control signaling, the terminal determines, based on different levels of channel signal-to-noise ratio according to a measured downlink channel condition, the channel condition level group to which the terminal belongs.

It deserves to be noted that, after separating the packet of the terminal, the terminal may store other packets, so that when the packets are required in the future, the terminal does not decode the packets again.

S406: If decoding is not completed within a set period of time, the terminal sends acknowledgment feedback of an unsuccessful response NACK to the base station, and adjusts the terminal to a group of a lower channel condition level, where the group of the lower channel condition level has a signal-to-noise ratio lower than that of a group to which the terminal currently belongs, so that when receiving a next fountain code block, the terminal decodes the next fountain code block by using a modulation-coding mode corresponding to the group of the lower channel condition level; and if decoding is completed within a set period of time, the terminal sends acknowledgment feedback of a successful response ACK to the base station, and adjusts the terminal to a group of a higher channel condition level, where the group of the higher channel condition level has a signal-to-noise ratio higher than that of a group to which the terminal currently belongs, so that when receiving a next fountain code block, the terminal decodes the next fountain code block by using a modulation-coding mode corresponding to the group of the higher channel condition level.

S407: If the base station receives, within a set period of time, the acknowledgment feedback of an unsuccessful response NACK sent by the terminal, the base station adjusts the terminal to the group of the lower channel condition level according to a set rule, where the group of the lower channel condition level has a signal-to-noise ratio lower than that of a group to which the terminal currently belongs; if the base station receives, within a set period of time, the acknowledgment feedback of a successful response ACK sent by the terminal, the base station adjusts the terminal to the group of the higher channel condition level according to a set rule, where the group of the higher channel condition level has a signal-to-noise ratio higher than that of a group to which the terminal currently belongs; or, if the base station does not receive, within a set period of time, acknowledgment feedback sent by the terminal, the base station does not adjust the channel condition level group to which the terminal belongs.

According to the unicast communication method provided in the embodiment of the present invention, a base station groups terminals based on channel condition levels according to measurement information of an uplink channel, selects a modulation-coding mode suitable for each channel condition level group, and codes a packet to be sent to a terminal by using fountain codes, so as to obtain a fountain code block, and then, sends the fountain code block to the terminal; and the terminal receives the fountain code block and decodes the fountain code block by using a modulation-coding mode corresponding to a channel condition level group to which the terminal belongs, and merely sends acknowledgment feedback or does not send acknowledgment feedback to the base station. In this way, since the coding mode of the fountain codes does not require channel quality feedback, which is different from the AMC or HARQ in the prior art, a feedback overhead in the system is reduced, the throughput of the system is improved, and transmission of a large amount of data is supported.

Figure 5:
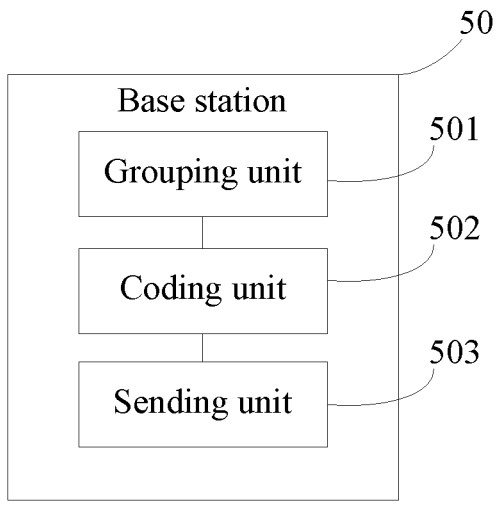
FIG. 5 is a schematic structural view of a base station according to an embodiment of the present invention.

As shown in FIG. 5, a base station 50 provided in an embodiment of the present invention includes:

a grouping unit 501, configured to group terminals based on channel condition levels according to measurement information of an uplink channel, so as to obtain at least two channel condition level groups;

a coding unit 502, configured to select a modulation-coding mode suitable for each channel condition level group obtained by the grouping unit 501, and code a packet to be sent to a terminal by using fountain codes, so as to obtain a fountain code block, where:

it deserves to be noted that, the coding unit 502 may be further configured to select a modulation-coding mode suitable for each channel condition level group obtained by the grouping unit 501, and jointly code a packet to be sent to terminals belonging to the same group by using fountain codes, so as to obtain a fountain code block; and a sending unit 503, configured to send the fountain code block obtained by the coding unit 502 to the terminal.

The base station provided in the embodiment of the present invention groups terminals based on channel condition levels according to measurement information of an uplink channel, selects a modulation-coding mode suitable for each channel condition level group, and codes a packet to be sent to a terminal by using fountain codes, so as to obtain a fountain code block, and then, sends the fountain code block to the terminal. In this way, after receiving the fountain code block and decoding the fountain code block by using a modulation-coding mode corresponding to a channel condition level group to which the terminal belongs, the terminal may merely send acknowledgment feedback to the base station or not send acknowledgment feedback. Since the coding mode of the fountain codes does not require channel quality feedback, which is different from the AMC or HARQ in the prior art, a feedback overhead in the system is reduced, the throughput of the system is improved, and transmission of a large amount of data is supported.

Figure 6:
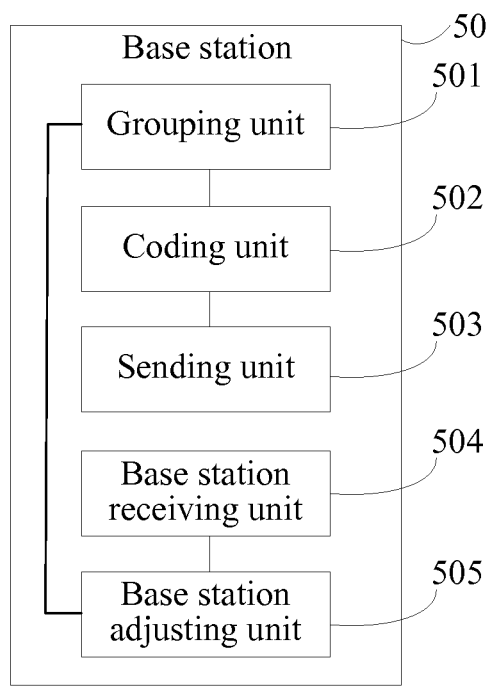
FIG. 6 is a schematic structural diagram of another base station according to an embodiment of the present invention.

Further, as shown in FIG. 6, the base station 50 further includes a base station receiving unit 504 and a base station adjusting unit 505.

It should be noted that, the grouping unit 501 is further configured to group the terminals based on different levels of channel signal-to-noise ratio according to the measurement information of an uplink channel; and the sending unit 503 is further configured to send control signaling indicating the channel condition level group to which the terminal belongs to the terminal.

The base station receiving unit 504 is configured to receive acknowledgment feedback sent by the terminal.

The base station adjusting unit 505 is configured to, if the base station receiving unit 504 receives, within a set period of time, the acknowledgment feedback of an unsuccessful response NACK sent by the terminal, adjust the terminal to a group of a lower channel condition level according to a set rule, where the group of the lower channel condition level has a signal-to-noise ratio lower than that of a group to which the terminal currently belongs; if the base station receiving unit 504 receives, within a set period of time, the acknowledgment feedback of an unsuccessful response NACK sent by the terminal, adjust the terminal to a group of a higher channel condition level according to a set rule, where the group of the higher channel condition level has a signal-to-noise ratio higher than that of a group to which the terminal currently belongs; otherwise, not adjust the terminal.

In this way, the base station may select a modulation-coding mode suitable for a channel condition of the group of the higher channel condition level, and send a next fountain code block to terminals belonging to the group of the higher channel condition level by using fountain codes; and the base station may also select a modulation-coding mode suitable for a channel condition of a group of the lower channel condition level, and send a next fountain code block to terminals belonging to the group of the lower channel condition level by using fountain codes.

This base station 50 may work by adopting the method provided in the foregoing embodiment. The working method is the same as the method provided in the embodiment, and no further details are provided herein.

The base station provided in the embodiment of the present invention groups terminals based on channel condition levels according to measurement information of an uplink channel, selects a modulation-coding mode suitable for a channel condition of each level group, and codes a packet to be sent to a terminal by using fountain codes, so as to obtain a fountain code block, and then, sends the fountain code block to the terminal. In this way, after receiving the fountain code block and decoding the fountain code block by using a modulation-coding mode corresponding to a channel condition level group to which the terminal belongs, the terminal may merely send acknowledgment feedback to the base station or not send acknowledgment feedback. Since the coding mode of the fountain codes does not require channel quality feedback, which is different from the AMC or HARQ in the prior art, a feedback overhead in the system is reduced, the throughput of the system is improved, and transmission of a large amount of data is supported.

Figure 7:
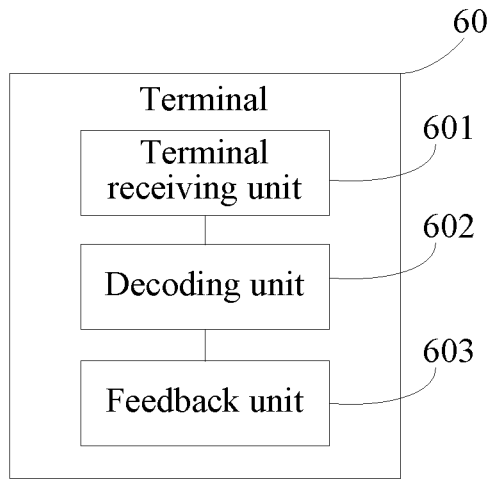
FIG. 7 is a schematic structural diagram of a terminal according to an embodiment of the present invention.

As shown in FIG. 7, a terminal 60 provided in an embodiment of the present invention includes:

a terminal receiving unit 601, configured to receive a fountain code block of a packet sent by a base station 40, and exemplarily, when the base station sends control signaling indicating a channel condition level group to which the terminal belongs, first receive the control signaling;

a decoding unit 602, configured to decode, according to a determined channel condition level group to which the terminal belongs, the fountain code block by using a modulation-coding mode corresponding to the channel condition level group, exemplarily, when the terminal receiving unit 601 receives the control signaling, determine, according to the control signaling, the channel condition level group to which the terminal belongs; and when the terminal receiving unit 601 does not receive the control signaling, measure a downlink channel condition, and determines, according to different levels of channel signal-to-noise ratio, the channel condition level group to which the terminal belongs, wherein:

it deserves to be noted that, when the received code block is code block obtained by jointly coding a packet sent by the base station 50, the decoding unit 602 is configured to decode the fountain code block and separate the packet of the terminal; and a feedback unit 603, configured to send or not send acknowledgment feedback to the base station 50.

The terminal provided in the embodiment of the present invention receives a fountain code block of a packet sent by a base station, decodes the fountain code block by using a modulation-coding mode corresponding to a channel condition level group to which the terminal belongs, and sends or does not send acknowledgment feedback to the base station. In this way, since the coding mode of the fountain codes does not require channel quality feedback, which is different from the AMC or HARQ in the prior art, a feedback overhead in the system is reduced, the throughput of the system is improved, and transmission of a large amount of data is supported.

Figure 8:
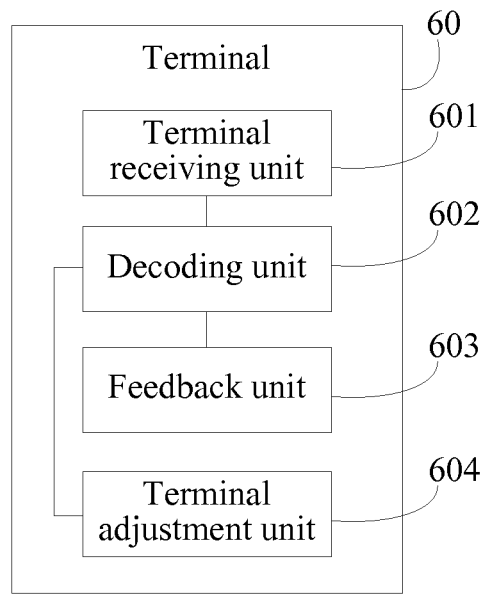
FIG. 8 is a schematic structural diagram of another terminal according to an embodiment of the present invention.
Figure 9:
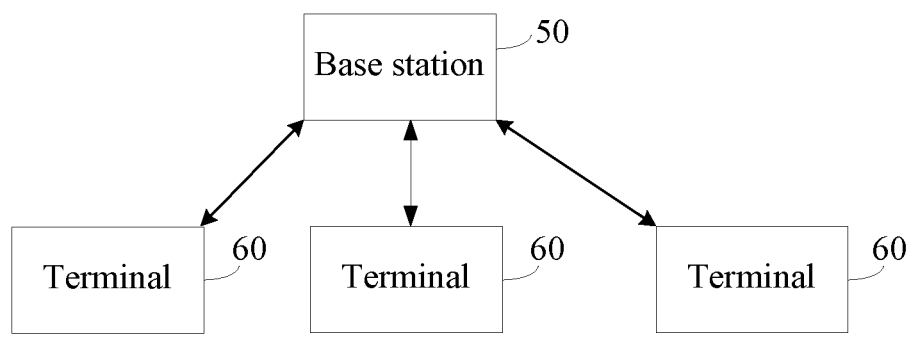
FIG. 9 is a schematic diagram of a unicast communication system according to an embodiment of the present invention.

As shown in FIG. 8, a terminal 60 provided in an embodiment of the present invention further includes a terminal adjusting unit 604.

Further, the feedback unit 603 is configured to, if the decoding unit 602 does not complete decoding within a set period of time, send acknowledgment feedback of an unsuccessful response NACK to the base station 50, and then the terminal adjusting unit 604 adjusts a terminal to a group of a lower channel condition level, where the group of the lower channel condition level has a signal-to-noise ratio lower than that of a group to which the terminal currently belongs, so that the decoding unit 602 decodes the fountain code block by using a modulation-coding mode corresponding to the group of the lower channel condition level; and if the decoding unit 602 completes decoding within a set period of time, send acknowledgment feedback of a successful response ACK to the base station 50, and then the terminal adjusting unit 604 adjusts the terminal to a group of a higher channel condition level, where the group of the higher channel condition level has a signal-to-noise ratio higher than that of a group to which the terminal currently belongs, so that when receiving a new fountain code block, the decoding unit 602 decodes the new fountain code block by using a modulation-coding mode corresponding to the group of the higher channel condition level This terminal 60 may work by adopting the method provided in the foregoing embodiment. The working method is the same as the method provided in the embodiment, and no further details are provided herein.

The terminal provided in the embodiment of the present invention receives a fountain code block of a packet sent by a base station, decodes the fountain code block by using a modulation-coding mode corresponding to a channel condition level group to which the terminal belongs, and sends or does not send acknowledgment feedback to the base station. In this way, since the coding mode of the fountain codes does not require channel quality feedback, which is different from the AMC or HARQ in the prior art, a feedback overhead in the system is reduced, the throughput of the system is improved, and transmission of a large amount of data is supported.

As shown in FIG. 8, a communication system provided in an embodiment of the present invention includes:

a base station 50, configured to group terminals 60 based on channel condition levels according to measurement information of an uplink channel, so as to obtain at least two channel condition level groups; select a modulation-coding mode suitable for each channel condition level group, and code a packet to be sent to a terminal 60 by using fountain codes, so as to obtain a fountain code block; and send the fountain code block to the terminal 60; and at least one terminal 60, configured to receive the fountain code block of the packet sent by the base station 50; determine a channel condition level group to which a terminal 60 belongs, and decode the fountain code block by using a modulation-coding mode corresponding to the channel condition level group; and send or not send acknowledgment feedback to the base station 50.

The base station 50 and the terminal 60 correspond to the foregoing method embodiments, the base station 50 and the terminal 60 may be used in the steps of the method embodiments, and as for specific applications in the steps, reference can be made to the foregoing method embodiments. The specific structures of the base station 50 and the terminal 60 are the same as those of the base station and the terminal provided in the foregoing embodiments, and no further details are provided herein.

In the communication system provided in the embodiment of the present invention, a base station groups terminals based on channel condition levels according to measurement information of an uplink channel, selects a modulation-coding mode suitable for each channel condition level group, and codes a packet to be sent to a terminal by using fountain codes, so as to obtain a fountain code block, and then, sends the fountain code block to the terminal; and the terminal receives the fountain code block and decodes the fountain code block by using a modulation-coding mode corresponding to a channel condition level group to which the terminal belongs, and merely sends acknowledgment feedback or does not send acknowledgment feedback to the base station. In this way, since the coding mode of the fountain codes does not require channel quality feedback, which is different from the AMC or HARQ in the prior art, a feedback overhead in the system is reduced, the throughput of the system is improved, and transmission of a large amount of data is supported.

The foregoing descriptions are merely several embodiments of the present invention, but not intended to limit the present invention. Various variations and modifications made by persons skilled in the art without departing from the spirit of the present invention fall within the scope of the present invention. Therefore, the protection scope of the present invention is subject to the appended claims.

What is claimed is:

1. A unicast communication method, comprising:
   grouping terminals based on channel condition levels according to measurement information of an uplink channel, so as to obtain at least two channel condition level groups;
   selecting a modulation-coding mode suitable for sending fountain codes for each channel condition level group, and coding a packet to be sent to a terminal by using so as to obtain a fountain code block; and
   sending the fountain code block to the terminal using the suitable modulation-coding mode, wherein:
   the grouping the terminals based on channel condition levels according to measurement information of the uplink channel comprises grouping the terminals based on different levels of channel signal-to-noise ratio according to the measurement information of an uplink channel, and
   after the sending the fountain code block to the terminal, the unicast communication method further comprises:
     if acknowledgment feedback of an unsuccessful response NACK sent by the terminal is received within a set period of time, adjusting the terminal to a group of a lower channel condition level according to a set rule; wherein the group of the lower channel condition level has a signal-to-noise ratio lower than that of a channel condition level group to which the terminal currently belongs.

2. The method according to claim 1, further comprising, after the selecting a modulation-coding mode, sending control signaling indicating a channel condition level group to which the terminal belongs to the terminal.

3. The method according to claim 1, after the sending the fountain code block to the terminal, further comprising:
   if acknowledgment feedback of a successful response ACK sent by the terminal is received within a set period of time, adjusting the terminal to a group of a higher channel condition level according to a set rule, wherein the group of the higher channel condition level has a signal-to-noise ratio higher than that of a channel condition level group to which the terminal currently belongs.

4. The method according to claim 1, wherein the selecting a modulation-coding mode comprises:
   selecting a modulation-coding mode suitable for each channel condition level group, and jointly coding a packet to be sent to terminals belonging to the same channel condition level group by using fountain codes, so as to obtain a fountain code block.

5. The method according to claim 1, further comprising:
   when the fountain code block is being sent to the terminal, if downlink channel fluctuation exceeds a preset threshold, discarding the fountain code block.

6. A unicast communication method, comprising:
   receiving a fountain code block of a packet sent by a base station;
   determining a channel condition level group to which a terminal belongs, and decoding the fountain code block by using a modulation-coding mode corresponding to the channel condition level group and suitable for sending the fountain code block; and sending or not sending acknowledgment feedback to the base station, wherein:

the determining a channel condition level group to which a terminal belongs comprises determining a channel condition level group to which the terminal belongs according to different levels of channel signal-to-noise ratio, and wherein the sending acknowledgment feedback to the base station comprises:

if decoding is not completed within a set period of time, sending acknowledgment feedback of an unsuccessful response NACK to the base station, and turning to a group of a lower channel condition level, wherein the group of the lower channel condition level has a signal-to-noise ratio lower than that of a channel condition level group to which the terminal currently belongs, so that when a next fountain code block is received, the next fountain code block is decoded by using a modulation-coding mode corresponding to the group of the lower channel condition level.

7. The method according to claim 6, wherein the determining a channel condition level group to which a terminal belongs comprises:

determining, according to received control signaling that is sent by the base station and indicates a channel condition level group to which a terminal belong, a channel condition level group to which the terminal belongs, or determining, according to a measured downlink channel condition, the channel condition level group to which the terminal belongs.

8. The method according to claim 6, wherein the sending acknowledgment feedback to the base station comprises:

if decoding is completed within a set period of time, sending acknowledgment feedback of a successful response ACK to the base station, and turning to a group of a higher channel condition level, wherein the group of the higher channel condition level has a signal-to-noise ratio higher than that of a channel condition level group to which the terminal currently belongs, so that when a next fountain code block is received, the next fountain code block is decoded by using a modulation-coding mode corresponding to the group of the higher channel condition level.

9. The method according to claim 6, wherein when the received fountain code block of the packet sent by the base station is fountain code blocks of packets of multiple terminals, the decoding the fountain code block comprises:

decoding the fountain code block, and separating a packet of a terminal.

10. A base station, comprising:

at least one hardware processor interfaced to memory including instructions to control the processor to:

group terminals based on channel condition levels according to measurement information of an uplink channel, so as to obtain at least two channel condition level groups;

select a modulation-coding mode suitable for sending fountain codes for each channel condition level group, and code a packet to be sent to a terminal by using the fountain codes, so as to obtain a fountain code block; and group the terminals based on different levels of channel signal-to-noise ratio according to the measurement information of an uplink channel; and a transmitter, configured to send the fountain code block to the terminal using the suitable modulation-coding mode a base station receiver, configured to receive acknowledgment feedback sent by the terminal:

wherein the instructions further control the at least one hardware processor to:

if the base station receiver receives, within a set period of time, the acknowledgment feedback of an unsuccessful response NACK sent by the terminal, adjust the terminal to a group of a lower channel condition level according to a set rule, wherein the group of the lower channel condition level has a signal-to-noise ratio lower than that of a group to which the terminal currently belongs; if the base station receiver receives, within a set period of time, the acknowledgment feedback of an unsuccessful response NACK sent by the terminal, adjust the terminal to a group of a higher channel condition level according to a set rule, wherein the group of the higher channel condition level has a signal-to-noise ratio higher than that of a group to which the terminal currently belongs; otherwise, not adjust the terminal.

11. The base station according to claim 10, wherein the transmitter is further configured to send control signaling indicating a channel condition level group to which the terminal belongs to the terminal.

12. The base station according to claim 10, wherein:

the instructions further control the at least one hardware processor to select a modulation-coding mode suitable for each channel condition level group obtained by the grouping unit, and jointly code a packet to be sent to terminals belonging to the same channel condition level group by using fountain codes, so as to obtain a fountain code block.

13. A terminal, comprising:

a terminal receiver, configured to receive a fountain code block of a packet sent by a base station;

at least one hardware processor interfaced to a memory including instructions which control the processor to:

according to a determined channel condition level group to which a terminal belongs and by using a modulation-coding mode corresponding to the channel condition level group and suitable for sending fountain codes from a transmitter to the terminal, decode the fountain code block received by the terminal receiver;

determine, according to different levels of channel signal-to-noise ratio, the channel condition level group to which the terminal belongs, and decode the fountain code block by using the modulation-coding mode corresponding to the channel condition level group;

if the decoding is not completed within a set period of time, send, using the transmitter acknowledgment feedback of an unsuccessful response NACK to the base station, and adjust the terminal to a group of a lower channel condition level, wherein the group of the lower channel condition level has a signal-to-noise ratio lower than that of a channel condition level group to which the terminal currently belongs, so that when receiving a next fountain code block, the terminal decodes the next fountain code block by using a modulation-coding mode corresponding to the group of the lower channel condition level; and a transmitter, configured to send acknowledgment feedback representing that the at least one hardware processor correctly decodes the fountain code block to the base station, or not send the acknowledgment feedback.

14. The terminal according to claim 13, wherein the instructions further control the at least one hardware processor to receive control signaling that is sent by the base station and indicates a channel condition level group to which the terminal belongs, and determine the channel condition level group to which the terminal belongs; or determine, according to a measured downlink channel condition, the channel condition level group to which the terminal belong.

15. The terminal according to claim 13, wherein the instructions further control the at least one hardware processor to:

if the decoding is completed within a set period of time, send, using the transmitter, acknowledgment feedback of a successful response ACK to the base station, and then adjust the terminal to a group of a higher channel condition level, wherein the group of the higher channel condition level has a signal-to-noise ratio higher than that of a channel condition level group to which the terminal currently belongs, so that when receiving a next fountain code block, the terminal decodes the next fountain code block by using a modulation-coding mode corresponding to the group of the higher channel condition level.

16. The terminal according to claim 13, wherein when the received fountain code block of the packet sent by the base station is fountain code blocks of packets of multiple terminals, the instructions further control the at least one hardware processor to decode the fountain code block, and separate a packet of the terminal.

17. A communication system, comprising:

a base station, configured to group terminals based on channel condition levels according to measurement information of an uplink channel, so as to obtain at least two channel condition level groups; select a modulation-coding mode suitable for sending fountain codes for each channel condition level group, and code a packet to be sent to a terminal by using the fountain codes, so as to obtain a fountain code block; and send the fountain code block to the terminal using the suitable modulation-coding mode; and at least one terminal, configured to receive the fountain code block of the packet sent by the base station; determine a channel condition level group to which the terminal belongs, decode the fountain code block by using a modulation-coding mode corresponding to the channel condition level group; and send or not send acknowledgment feedback to the base station.

* * * * *